United States Patent [19]
Atkins

[11] Patent Number: 5,855,386
[45] Date of Patent: Jan. 5, 1999

[54] VEHICLE

[75] Inventor: David S. Atkins, Broederstroom, South Africa

[73] Assignee: Terrapid Technologies CC, South Africa

[21] Appl. No.: 731,260

[22] Filed: Oct. 11, 1996

[30] Foreign Application Priority Data

Oct. 11, 1995 [ZA] South Africa .......................... 95/8561

[51] Int. Cl.$^6$ .................................................. B62D 7/16
[52] U.S. Cl. ........................ 280/124.111; 280/124.169; 280/93.51; 180/400
[58] Field of Search ................................ 280/660, 664, 280/671, 717, 695, 700, 691, 111, 771, 93, 96, 846, 93.502, 93.51, 124.169, 124.177, 124.134, 124.135, 124.11, 124.111; 180/78, 400; 267/265, 267, 263, 269, 276, 277, 52, 279

[56] References Cited

U.S. PATENT DOCUMENTS

| | | |
|---|---|---|
| 1,993,260 | 3/1935 | Burns . |
| 2,166,774 | 7/1939 | Tjaarda . |
| 2,206,901 | 7/1940 | Klotsch . |
| 2,242,030 | 5/1941 | Hicks . |
| 3,161,251 | 12/1964 | Kraus . |
| 3,545,737 | 12/1970 | Lamprey .................................. 267/279 |
| 4,655,467 | 4/1987 | Kitzmiller et al. . |

*Primary Examiner*—Paul N. Dickson
*Attorney, Agent, or Firm*—Darby & Darby

[57] ABSTRACT

A front suspension unit for the independent suspension of the front wheels of a motor powered off road four wheel vehicle comprising a pair of suspension units with their outer casings mounted together and the inner members carrying laterally extending arms with their free ends constituted for attachment to front wheel mounting assemblies and such units in combination with a steering assembly having a column to be supported at one end from the vehicle chassis and carrying a steering wheel and axle on the other end, the axle having a chain and sprocket mounted thereon with the ends of the chain attached to a plate rotatably mounted on the column and carrying link arms to be attached one to each of the front wheel mounting assemblies.

9 Claims, 5 Drawing Sheets

VEHICLE

INTRODUCTION

This invention relates to a vehicle and more particularly to small motor driven vehicles such as those known as go-karts and golfers caddy carts for example.

BACKGROUND OF THE INVENTION

Small vehicles of the kind referred to are becoming more and more popular for recreational and other general purpose off-road usage. In general the vehicles lack adequate suspension units to enable them to be used at speed unless they are driven on flat and smooth prepared tracks. This is a severe limitation and removes much of the pleasure to which they could otherwise be put.

OBJECT OF THE INVENTION

It is the object of the present invention to provide a vehicle which will overcome the above disadvantages to a large degree.

SUMMARY OF THE INVENTION

According to this invention there is provided a motor powered off-road four wheeled vehicle having a front wheel suspension provided through a pair of suspension units of the type having a resilient member, which can be in block form, between an inner member and an outer casing with the outer casings of the units mounted together centrally of the chassis and for the inner members to carry laterally extending arms terminating in wheel mounting assemblies.

Further features of this aspect of the invention provide for the wheel mounting ends of the arms to be braced by stays extending forwardly and inwardly to points on the chassis substantially in line with the suspension units and for the stays to have swivel joints at their connection points.

Another aspect of this invention provides steering for the front wheels comprising a mounting column supported on the chassis and carrying a steering axle and bush having a chain and sprocket to provide the steering movement through link arms extending to the wheel mounting assemblies.

Further features of this aspect of the invention provide for the inner ends of the link arms to be mounted through swivels to a plate or sprocket rotatable by the chain, for these mountings to be close to the centre line of the vehicle at the height of the centre line of the suspension units, and for the outer ends of the link arms to be connected to rearwardly extended members rigidly connected to the wheel mounting assemblies.

The invention also provides for the mounting column to be pivotally supported on the chassis and located by an adjustable stay extending between the column and the chassis forward of the column.

BRIEF DESCRIPTION OF THE DRAWINGS

The above features and many other will become apparent from the following description of one example of the invention. In this description reference will be made to the accompanying drawings in which.

DETAILED DESCRIPTION OF THE DRAWINGS

Figure 1:
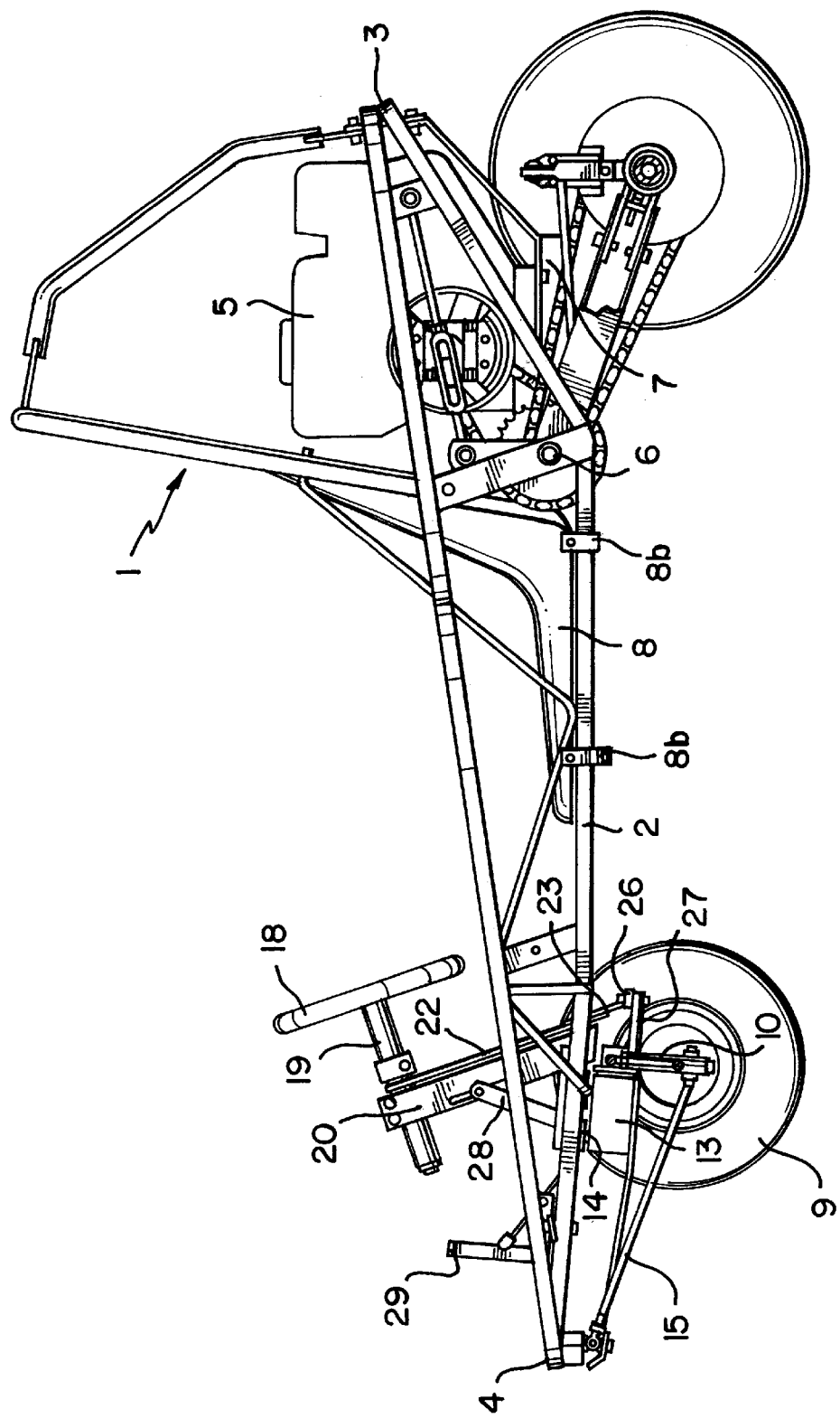
FIG. 1 is a side elevation of the vehicle.
Figure 2:
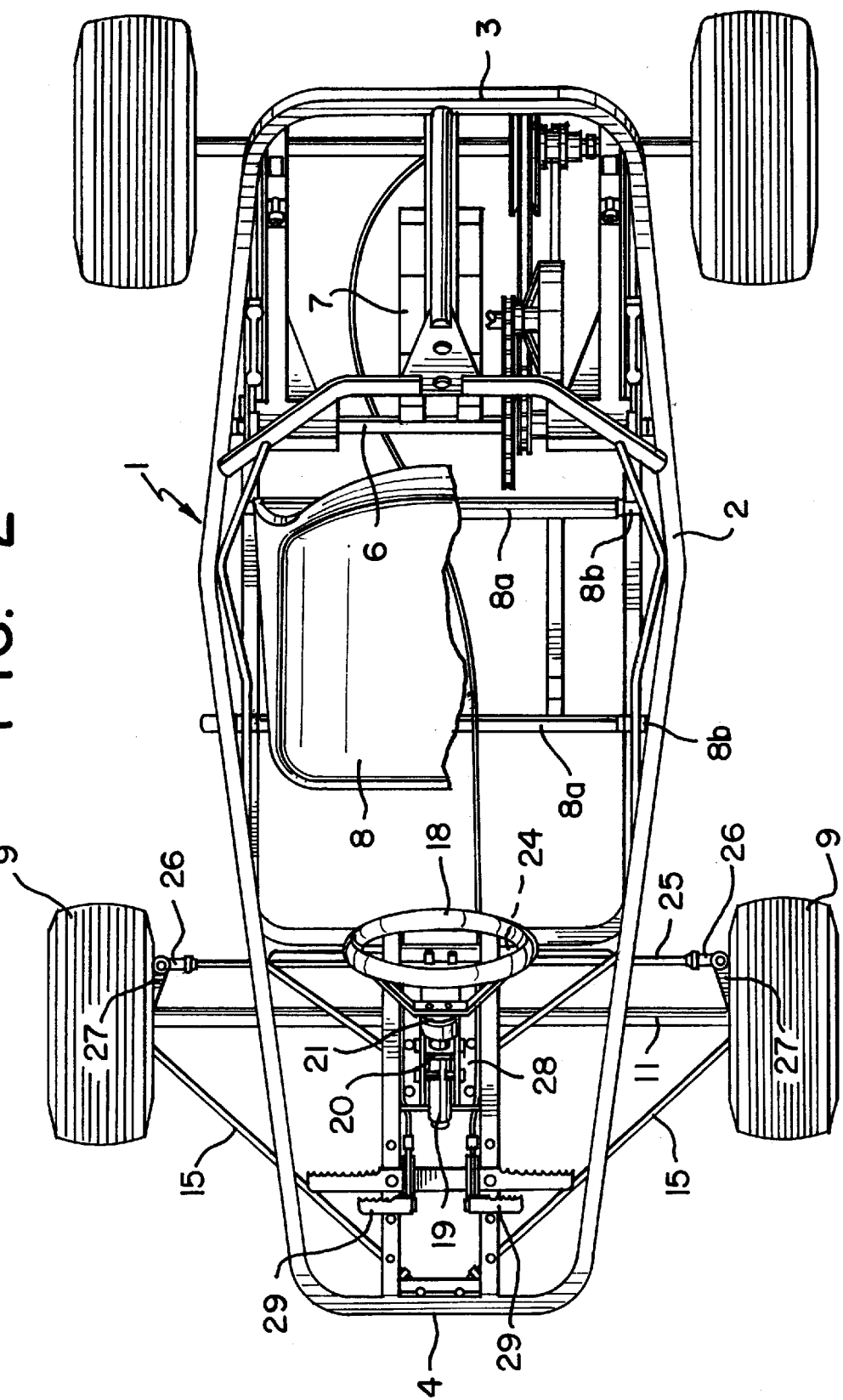
FIG. 2 a plan view.
Figure 3:
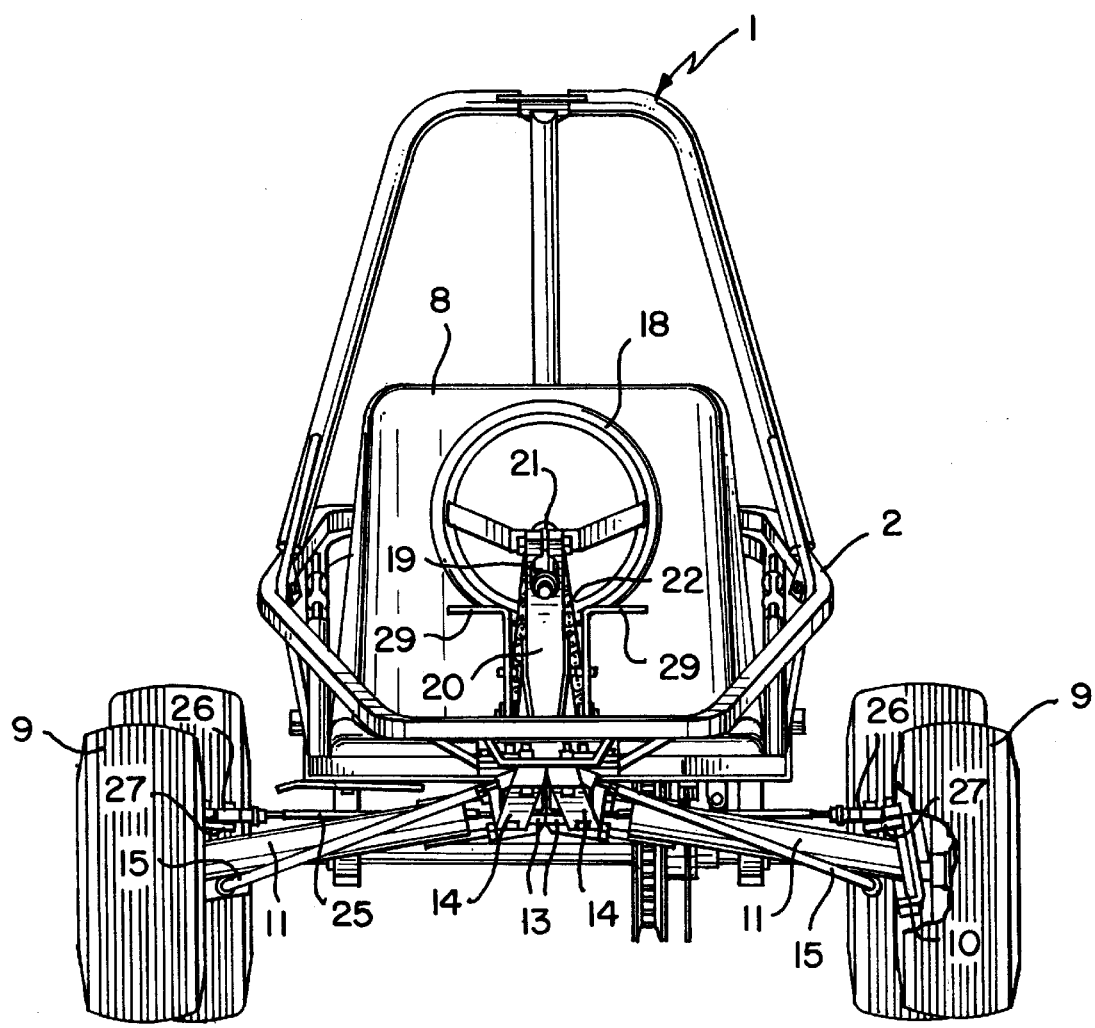
FIG. 3 is a front view.

As illustrated the invention is applied to a vehicle which illustratively is an off-road go-kart.

The vehicle indicated generally at (1) in the accompanying drawings has a chassis (2) fabricated from suitable bent and welded hollow steel tubing. The chassis (2) has a generally upwardly inclined rear end (3) and inwardly tapered front end (4).

A conventional motor (5) in the form of internal combustion engine is mounted in a cradle formed by a lay shaft (6) and a bracket (7) so that the motor is bolted in position in the chassis (2) by a single bolt at the rear of the chassis through the bracket (7) and bolts onto the lay shaft (6).

A driver's seat (8) is mounted to the chassis (2) forward of the motor (5) and this seat is adjustable along the length of the chassis (2). The seat is supported on rollers (8a) carried by clamps (8b) securable to the chassis by means of a spring-loaded indent pin in well known manner.

The front wheels (9) are each mounted on stub axle and king pin assemblies indicated at (10). Each king pin assembly (10) is carried by an arm (11) which has its end remote from the king pin assembly (10) secured to the inner member (12) of a suspension unit (13). (See FIGS. 4 and 5) of the type having at least one resilient element, such as a block 12B, between an inner member 12 and an outer casing 13A.

The outer casing of each suspension unit is secured through plates (14) to the chassis (2). The two outer casings are mounted against each other on either side of the longitudinal axis of the chassis (2).

Bracing stays (15) extend between the front of the chassis (2) to the ends of each arm (11) and the connections at the ends of the stays (15) are effected through universal swivel couplings. The forward ends of stays (15) are substantially in line with the suspension units (13).

The assembly above described affords independent suspension for each front wheel and the mounting to the chassis through the plates (14) enables the front wheel assembly and suspension to be removed as a unit from the chassis (2).

Figure 4:
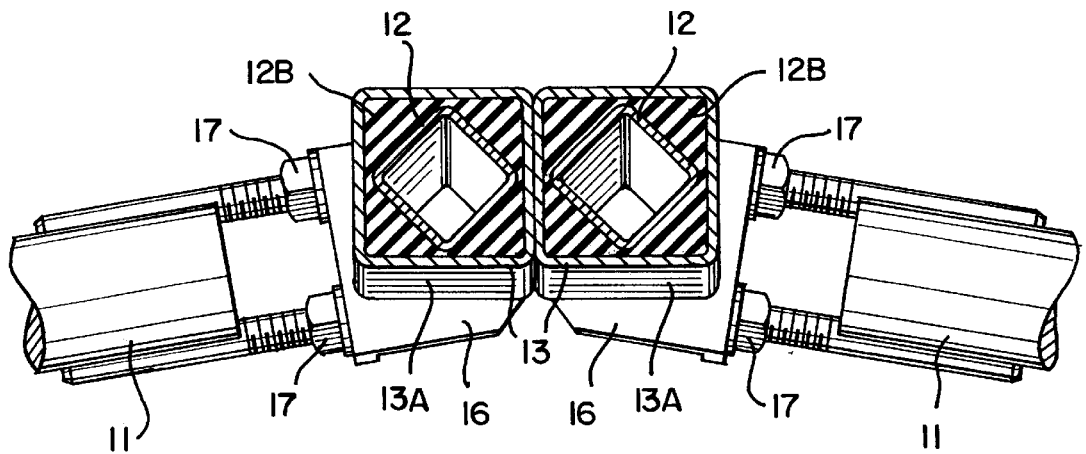
FIGS. 4 and 5 are details of components of the vehicle.
Figure 5:
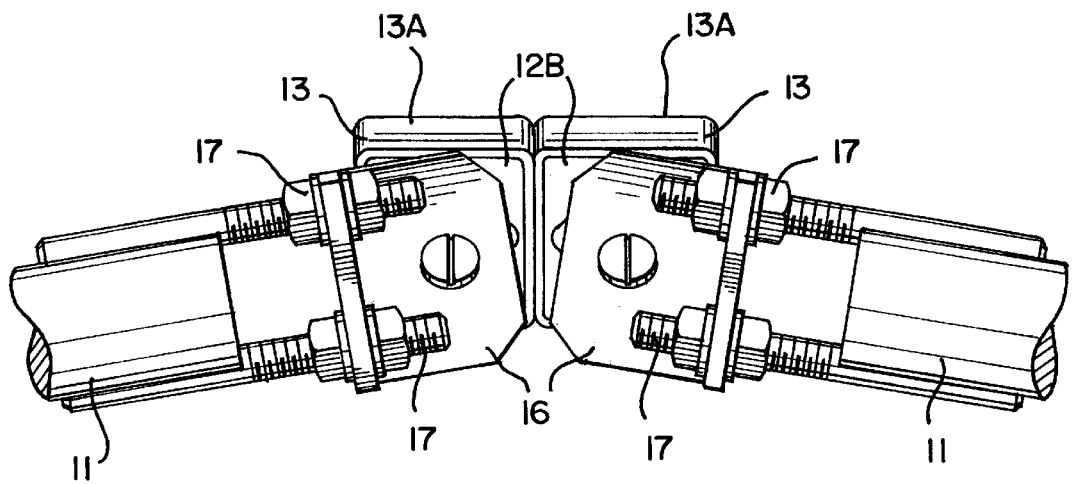

As can be seen from FIGS. 4 and 5 the arms (11) are connected to the inner members of the suspension units through angle brackets (16) and a pair of bolts (17). By separately setting the individual bolts (17) of each pair, the loading of the arms (11) through the suspension units (13) can be easily adjusted to suit the load on the vehicle and terrain over which it is to be driven.

Figure 6:
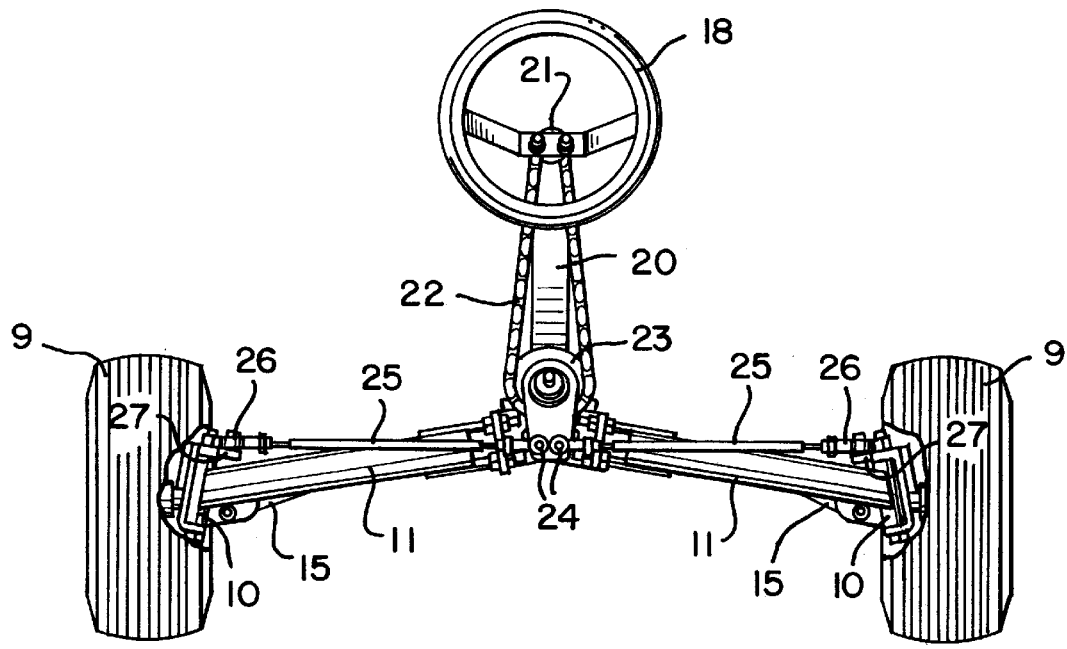
FIGS. 6 and 7 show the steering mechanism for the vehicle.
Figure 7:
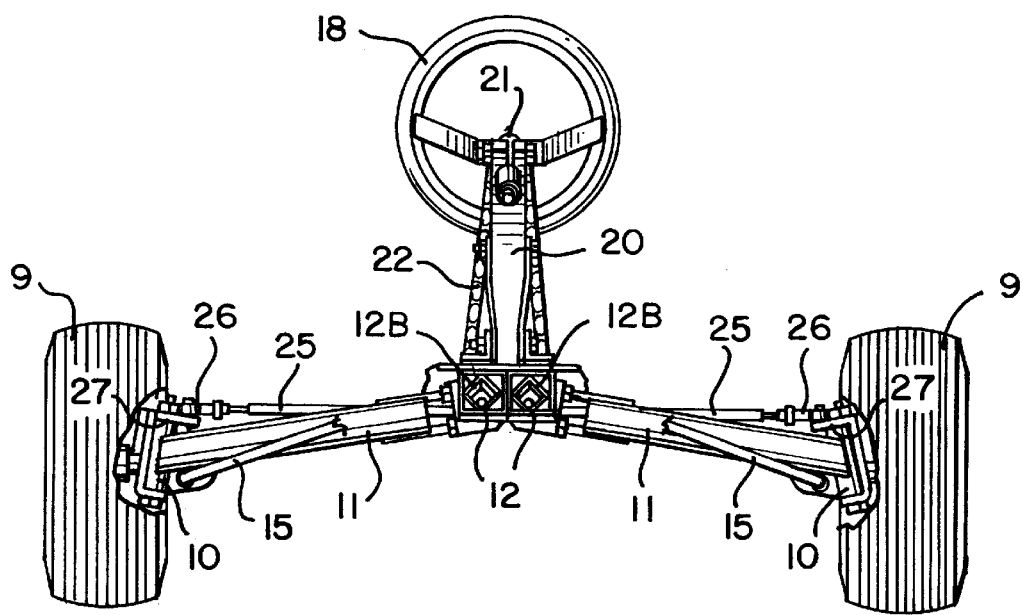

Steering for the vehicle is provided by a steering wheel (18) supported on a shaft (19) carried in a mounting plate (20). This is illustrated in FIGS. 6 and 7.

The shaft (19) has a sprocket (21) secured thereto which co-operates with a chain (22) which has its ends anchored to opposite sides of a rotatably supported plate in the form of a disc (23). The disc (23) is connected by means of swivel joints (24) to link arms (25) having their opposite ends connected also through swivel joints (26) to rearwardly extending members (27) rigidly connected to the king pin assemblies (10).

The swivel joint connections (24) to the disc (23) are located at the same height and substantially in line with the centre lines of the suspension units (13).

The mounting plate (20) is pivotally supported on the chassis (2) and braced by a bracket arrangement (28) which allows the steering wheel position to be adjustable. Also this arrangement enables the steering assembly to be easily removed from the vehicle as a unit.

Pedals (29) are pivotally mounted on the chassis and the pedal arms used to operate Bowden cables. One cable is used to operate the motor accelerator and the other to operate the disc brake assembly as described above.

The construction described above enables components of the vehicle to be of substantially modular construction which facilitates both assembly and repair. The vehicle is also robust and the various features enable it to be economically manufactured while providing a unique construction for vehicles of this kind.

It will be appreciated that many variations and modifications to the details of construction set out above can be made without departing from the scope of this invention. Protection roll bars may be included and the design shape of the chassis varied to suit requirements. Also the vehicle may be modified from the go-kart described to be suitable as a golfers caddy cart or some other low speed vehicle to be used over uneven terrain.

What I claim as new and desire to secure by Letters Patent is:

1. A front suspension unit for the chassis of a motor powered off road four wheeled vehicle comprising:
   a pair of suspension units each including at least one resilient block between an inner member and an outer casing with the outer casings of said units mounted together;
   the inner member of each unit carrying a laterally extending arm having a free end constructed to terminate in a front wheel mounting assembly; and
   stays, each having one end connected to the free end of a respective arm, each stay extending forwardly and inwardly such that a second can end of the stay can connect to a point on the vehicle chassis substantially in line with the suspension unit carrying the arm to which the stay is connected.

2. A front suspension unit as claimed in claim 1 in which each stay has a swivel connecting joint at said second end.

3. A front suspension unit as claimed in claim 1 in which each arm is connected to the respective outer casing of the respective suspension unit by a pair of individually adjustable bolts for adjusting the loading of the assembly.

4. A front suspension unit as in claim 1 and further comprising a plate for securing said suspension units to the chassis.

5. A motor powered off-road four wheeled vehicle comprising:
   a vehicle chassis;
   a pair of front suspension units each including at least one resilient block between an inner member and an outer casing with said outer casings mounted together;
   each inner member carrying a laterally extending arm having a free end secured to a front wheel mounting assembly;
   a steering assembly having a mounting column with a steering wheel on one end of a column supported from the vehicle chassis; and
   a steering axle having a chain and sprocket mounted thereon with free ends of the chain attached to a rotatable plate to which is attached the ends of link arms attached to the wheel mounting assemblies.

6. An off-road vehicle as claimed in claim 5 in which each suspension unit is carried on a plate secured to the vehicle chassis.

7. An off-road vehicle as claimed in claim 5 in which the column is pivotally supported from the chassis and has an adjustable stay extending between the column and the chassis.

8. An off-road vehicle as claimed in claim 5 in which the ends of link arms remote from said plate are connected to rearwardly extending members rigidly connected to the wheel mounting assemblies.

9. An off-road vehicle as claimed in claim 8 in which the ends of the link arms attached to the plate are located close to the longitudinal center line of the vehicle and are at substantially the same height as the center line of the suspension units for the steered wheels.

* * * * *